Figure 1:
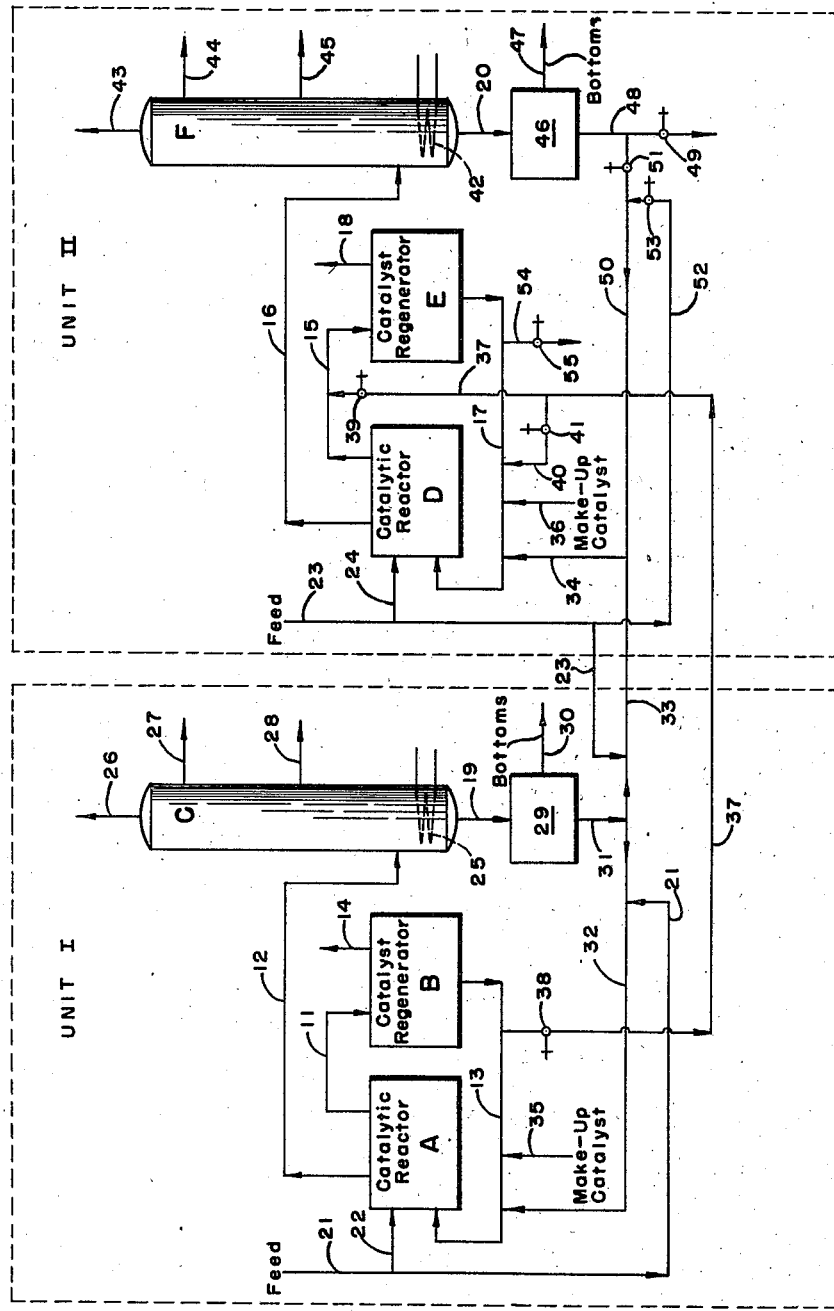

Sept. 2, 1947. J. P. HAMILTON ET AL 2,426,869
CATALYTIC CRACKING PROCESS
Filed Sept. 24, 1945 2 Sheets-Sheet 1

INVENTORS.
Julian P. Hamilton, Arthur E. Rubey, Jr.
BY
J. P. M°Kean
ATTORNEY.

Patented Sept. 2, 1947

2,426,869

UNITED STATES PATENT OFFICE 2,426,869

CATALYTIC CRACKING PROCESS

Julian P. Hamilton, Pelly, and Arthur C. Rubey, Jr., Baytown, Tex., assignors to Standard Oil Development Company, a corporation of Delaware Application September 24, 1945, Serial No. 618,326

6 Claims. (Cl. 196—52)

1

The present invention is directed to improvements in the art of converting hydrocarbon feed stock in the presence of fluidized solid catalyst.

It is known to the art to bring a hydrocarbon feed stock into intimate contact with a solid catalyst in a reaction zone under conditions to cause the chemical conversion of the hydrocarbon feed stock, and to remove spent catalyst from the reaction zone and add make-up catalyst thereto in order to maintain a desired catalyst activity within the reaction zone. In commercial operations involving such catalytic processes, it is usually desirable to employ a plurality of units with each unit including a reaction zone and a regeneration zone, to withdraw used catalyst from a reaction zone to a regeneration zone, and to return the regenerated catalyst to the reaction zone from which it was withdrawn. When a plurality of such units are being operated, it will usually be found that the equilibrium catalytic activities in the separate units are different, even though the identical catalyst is charged to the several units when starting up and as fresh make-up catalyst. The differences in the catalytic activities in the several units may be due to differences in the design of the units, in the operating conditions of the units, and in the hydrocarbon charging stock supplied to the units. For example, a fluid catalyst unit known as the "up-flow" type may have a different catalyst activity from a unit known as the "down-flow" type, and similarly the use of different charging stocks requires different operating conditions in order to obtain desired products from the several units.

Maximum catalyst activity is desirable in the catalytic cracking processes since an increase in the catalyst activity results in improved product distribution (more iso compounds and aviation base stock with less dry gas and carbon production). In addition, the capacity of a catalytic cracking installation, as limited by carbon burning rate or dry gas production, will be greater with higher catalyst activity because of the decreased carbon and dry gas production.

It is an object of the present invention to convert hydrocarbons catalytically in a plurality of separate reaction zones, to remove catalyst from each zone, to regenerate the catalyst, to supply a mixture of fresh and regenerated catalyst to each zone, and to control the mixture of regenerated and fresh catalyst added to each zone to obtain an improved catalytic activity in the entire operation.

The present invention may be described briefly as involving a system having a plurality of units with hydrocarbon feed stock reacted in the presence of fluidized solid catalyst and the spent catalyst regenerated in each unit, and regenerated catalyst and fresh catalyst added to the reaction zone of each unit, wherein the catalyst activity is different in the several units and the major portion of the spent catalyst is discarded from the system only from the unit having catalyst of lowest catalytic activity and the discarded catalyst is replaced by regenerated catalyst from a unit of higher catalytic activity or by a mixture of this regenerated catalyst and fresh catalyst.

Figure 2:
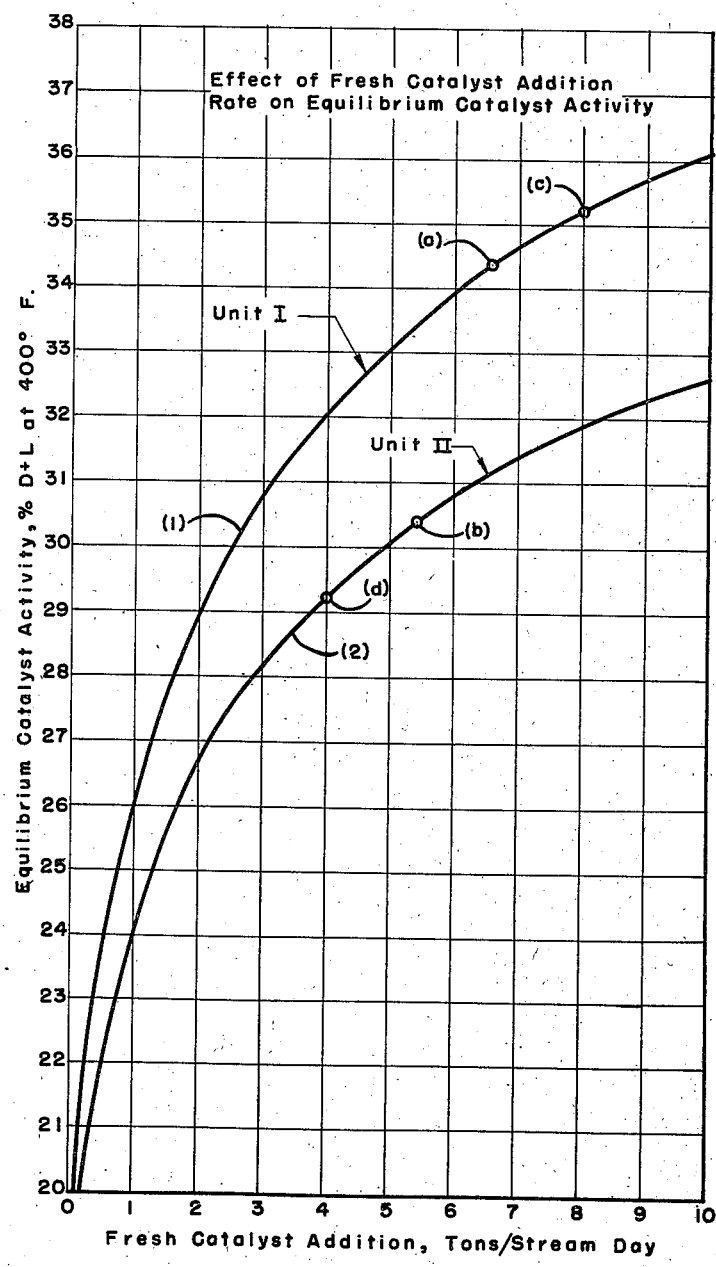

The invention will now be described in greater detail in conjunction with the drawing wherein Figure 1 is in the form of a diagrammatic flow sheet, and Figure 2 is in the form of curves showing how the catalyst activity in two different reaction units is effected by the addition of fresh catalyst to said units.

Turning now specifically to the drawing and first to Figure 1, two separate catalytic cracking units are shown. The first unit is enclosed in broken lines, identified as unit I, and includes a catalytic reactor A, a catalyst regenerator B and a distillation unit C. The second unit also is included within broken lines, designated as unit II, and includes catalytic reactor D, catalyst regenerator E and fractional distillation unit F. The separate units including reactor, regenerator and distillation columns may be conventional to the art; for example, a conventional "up-flow" or "down-flow" type of reactor of the fluid catalyst type may be used in conjunction with the conventional regenerator and conventional distillation column. For simplicity of illustration reactors A and D and regenerators B and E have been shown as rectangles on the drawing. However, it is to be understood that these zones include conventional auxiliary equipment such as pumps, blowers, and centrifugal or electrical separators for separation of solid catalyst particles from vapors or gases. In such catalytic units, it is customary to remove spent catalyst from the reactor.

In the first unit, the spent catalyst is withdrawn through line 11 and passes to regenerator B, while hydrocarbon contaminated with a small amount of catalyst is withdrawn through line 12 and passes to distillation column C. Regenerated catalyst from regenerator B is returned to reactor A through line 13. Gaseous combustion products resulting from regeneration of the catalyst and containing non-recoverable catalyst and catalyst fines, are discarded to the atmosphere from regenerator B through line 14. In the second unit, spent catalyst is withdrawn from reactor D through line 15 to regenerator E and hydrocarbon, containing a small amount of catalyst, is withdrawn and passes through line 16 to distillation column F. Regenerated catalyst passes from regenerator E through line 17 to reactor D and combustion gases and non-recoverable catalyst are discarded to the atmosphere through line 18. As previously mentioned, the hydrocarbon fractions removed from catalytic reactors A and D respectively, have small quantities of catalyst admixed with the hydrocarbon and, accordingly, the bottoms withdrawn from distillation columns C and F through lines 19 and 20, respectively, comprise a mixture of heavy oil and catalyst.

A hydrocarbon feed stock is supplied to unit I through inlet lines 21 and 22. Similarly, a hydrocarbon feed stock is supplied to unit II through lines 23 and 24.

The mixture of hydrocarbon and catalyst from catalytic reactor A passes through line 12 to distillation column C where it is separated into a plurality of fractions. Distillation column C is provided with a heating means 25 to aid in the vaporization of the hydrocarbons within the tower. The tower is provided with outlet lines 26, 27 and 28 for withdrawing a plurality of distillate fractions. It will be understood that distillation column C is shown schematically and, in commercial operations, the distillation step may be conducted in a plurality of columns and any number of desired distillate fractions may be obtained. The bottoms from the distillation step comprising a mixture of heavy hydrocarbon oil and finely divided catalyst as withdrawn through line 19 to a separating means 29 which separates the slurry into an oil fraction withdrawn through line 30 from a catalyst fraction withdrawn through line 31. It is generally preferable not to recycle the oil from line 30 to reactor A since recracking of this oil has a tendency to deposit excessive amounts of carbon upon the catalyst. The separating means 29 may be a conventional means such as a filter, a Dorr thickener, or other settling devices.

A portion of the catalyst from line 31 is recycled by lines 32 and 13 to reactor A; feed stock from line 21 is admixed with this portion of the recovered catalyst to make a slurry for charging to reactor A through lines 32 and 13. The remainder of the catalyst recovered through line 31 is mixed with feed stock from line 23 to make a slurry for charging to reactor D through lines 33, 34 and 17. Fresh make-up catalyst is added to reactor A through lines 35 and 13 while fresh catalyst is similarly added to reactor D through lines 36 and 17. Alternatively line 35 may connect into line 32 and line 36 may connect into line 33 or 34.

For purposes of description, it is assumed that the catalyst in unit I has a higher equilibrium catalytic activity than the catalyst in unit II. It has heretofore been pointed out that such differences in catalytic activity may be due to a variety of causes, such as differences in the design of the units, in the feed stock employed, or in the temperature of the reaction, and such differences are commonly encountered when employing a plurality of catalytic units in a commercial operation. In accordance with the present invention, a portion of the catalyst which has been employed in unit I is transferred from unit I to unit II. In the preceding description, it has been assumed that the catalyst to be transferred from unit I to unit II would be withdrawn from line 31 and transported as an oil slurry through lines 33, 34, and 17. In some instances, other methods of transferring catalyst from unit I to unit II may be preferable. For example, when the two units are located close together, it may be desirable to provide a line connecting line 11 out of reactor A to line 15 entering regenerator E. On the other hand, in many instances it will be preferable to withdraw regenerated catalyst from regenerator B through line 13 and line 37 containing valves 38 and 39. In this way regenerated catalyst may be introduced into regenerator E through line 15. Alternatively the regenerated catalyst from line 37 may be introduced into catalytic reactor D through line 40, containing valve 41, and line 17. In some operations it may even be desirable to employ two or more of the previously described methods of transferring catalyst from unit I to unit II as will be evident to a worker skilled in the art.

As previously mentioned, the hydrocarbon product contaminated with a small amount of solid catalyst passes from reactor D through line 16 to distillation unit F where it may be separated into a plurality of fractions. In the drawing, distillation unit F is shown as comprising a single tower provided with a heating means 42 and a plurality of outlets 43, 44 and 45 for removing a plurality of distillate fractions. In commercial operations, distillation unit F may consist of a number of distillation towers and may be provided with as many outlets as desired for removing distillate fractions. The mixture of bottoms fractions and catalyst withdrawn from distillation zone F through outlet 20 passes to a separating means 46 which may be similar to separating means 29. Since it is generally undesirable to recycle the heavy oil from distillation unit F to catalytic unit D, this oil is withdrawn through line 47. The catalyst is withdrawn from separating means 46 through line 48, containing valve 49, and, if desired, may be discarded from the system. Since this catalyst contains small amounts of recoverable oil, it may be returned to catalytic reactor D through line 50, containing valve 51, and lines 34 and 17. When this catalyst is recycled, it is desirable to draw a sufficient amount of feed stock from line 23 through line 52, containing valve 53, for making a slurry of oil and clay in line 50.

As will be evident to the worker skilled in the art, rather than discard spent catalyst through line 48 and valve 49, under some conditions it will be desirable to operate the catalyst precipitators on regenerator E in such a fashion that all of the catalyst which is to be rejected from unit II will pass out of line 18 with the regeneration gases. It will also be evident that under some conditions it will be preferable to discard all or part of the spent catalyst from unit II through line 17 and line 54, containing valve 55.

Since, in this illustration it is assumed that the catalyst in unit I is of higher equilibrium catalyst activity than catalyst in unit II, it is evident that maximum benefit from this invention will be attained when the unrecoverable losses of catalyst from unit I, as, for example, through line 14, are kept at a minimum and the maximum amount of catalyst that can be transferred from unit I to unit II, consistent with maintenance of a constant inventory of circulating catalyst in unit I and with proper division of fresh make-up catalyst to each unit, should be transferred from unit I to unit II by means heretofore described. It is within the scope of this invention to discard all of the catalyst other than normal, unrecoverable losses of unit I through any line or combination of lines mentioned for the purpose of discarding catalyst from unit II.

It will be obvious that, in order to maintain the two catalytic units in equilibrium, the total amount of spent catalyst withdrawn from the second unit must equal the amount of make-up catalyst added to the first unit through inlet line 35 and to the second unit through line 36 less the catalyst lost with the regenerator flue gases through lines 14 and 18, respectively. It will also be apparent that, in order to maintain equilibrium conditions in the first unit, the amount of catalyst withdrawn from the first to the second unit must equal the make-up catalyst added to the first unit through inlet line 35 less the quantity of catalyst lost with the regenerator gases passing through line 14.

It is known to the catalytic cracking art that the activity of the catalyst tends to decrease as a function of time the catalyst is in use, and the rate of decrease varies with the design of the catalytic unit, the operating conditions and the charge stock. In order to maintain catalyst activity in a catalytic unit, it is usual to add fresh make-up catalyst to the unit and to discard used catalyst therefrom in an equal amount as required to maintain catalyst inventory in the unit. Under these conditions, catalyst activity in the unit reaches an equilibrium value. It is desirable to maintain a high equilibrium catalyst activity inasmuch as an increase in equilibrium catalyst activity results in an improved product as well as an increase in capacity.

In Fig. 2 is shown the relationship between the equilibrium catalyst activity and the fresh catalyst addition rates for two representative fluid catalyst cracking units. In this figure, the equilibrium catalyst activity of each unit is plotted as the ordinate and the amount of fresh catalyst added to each unit is plotted as the abscissa.

The equilibrium catalyst activity is indicated on the ordinate as per cent D+L at 400° F. The expression "D+L at 400° F." is a measure of catalyst activity. The method of expressing catalyst activity (D+L at 400° F.) indicates the percentage distilled at 400° F. plus the distillation loss of the naphtha obtained after passing a standard feed stock through the catalyst being tested under standard conditions of temperature and pressure. This method of expressing catalyst activity has been adopted in the cracking industry.

The curve defined as (1) indicates the equilibrium catalyst activity of the first unit comprising reactor A, regenerator B and distillation column C with spent catalyst being discarded from the unit in an amount equal to the make-up catalyst less the catalyst lost through line 14. The curve designated as (2) shows the equilibrium catalyst activity of the second catalytic unit including reactor D, regenerator E and distillation column F with no spent catalyst being transferred from the first unit to the second unit, that is, with the make-up catalyst added to the second unit exactly equal to the amount of spent catalyst discarded therefrom. It will be noted that the equilibrium catalyst activity for a given fresh catalyst addition rate is greater for curve (1) than for curve (2); this difference may be due to differences in design of the units, operating conditions and charge stock. On both curves the first increment of fresh catalyst added to the unit is more effective in increasing equilibrium catalyst activity than any subsequent increment of fresh catalyst.

It will be apparent that in commercial operations the available amount of make-up catalyst is limited by a number of factors. The optimum distribution of the available amount of catalyst to obtain the maximum catalyst activity of two typical units may be determined by the use of the curves in Figure 2. However, similar curves must be obtained for each particular unit and its normal operating conditions and feed stocks. The use of these curves will be illustrated by the following examples which further illustrate the invention.

An analysis made in connection with two typical commercial catalytic cracking units shows that the optimum amount of fresh make-up catalyst (having an equilibrium catalytic activity of 55% D+L at 400° F.) which should be charged to these units is 12 tons per day. If, for example, this 12 tons per day is taken as the total fresh catalyst that is to be charged to these units, the equilibrium activity at the two units and the average equilibrium activity of the combined units with no shifting of catalyst from one unit to the other may be determined by tabulating the equilibrium activities and the amount of make-up catalyst used in the units as indicated in Table I:

*Table I*

| | | | | | | | | | | | |
|---|---|---|---|---|---|---|---|---|---|---|---|
| Unit I: | | | | | | | | | | | |
| Fresh Catalyst, Tons Per Day | 1.7 | 2.0 | 3.0 | 4.0 | 5.0 | 6.0 | 16.6 | 7.0 | 8.0 | 9.0 | 10.0 | 10.3 |
| Equilibrium Activity, Per Cent D+L | 28.25 | 29.00 | 30.80 | 32.10 | 33.10 | 33.90 | 34.30 | 34.60 | 35.10 | 35.70 | 36.20 | 36.30 |
| Unit II: | | | | | | | | | | | |
| Fresh Catalyst, Tons Per Day | 10.3 | 10.0 | 9.0 | 8.0 | 7.0 | 6.0 | 15.4 | 5.0 | 4.0 | 3.0 | 2.0 | 1.7 |
| Equilibrium Activity, Per Cent D+L | 32.75 | 32.60 | 32.30 | 31.80 | 31.30 | 30.80 | 30.40 | 30.10 | 29.20 | 28.20 | 26.60 | 26.00 |
| Total Fresh Catalyst, Tons/Day | 12.0 | 12.0 | 12.0 | 12.0 | 12.0 | 12.0 | 12.0 | 12.0 | 12.0 | 12.0 | 12.0 | 12.0 |
| Average Equilibrium Activity, Per Cent D+L | 30.50 | 30.80 | 31.55 | 31.95 | 32.20 | 32.25 | 32.35 | 32.25 | 32.15 | 31.95 | 31.40 | 31.15 |

¹ Optimum.

It will be seen in Table I that the optimum distribution of catalyst between the two units is 6.6 tons per day at the first unit and 5.4 tons per day at the second unit. This distribution results in an equilibrium catalyst activity of 34.30% and 30.40% at the first and second units, respectively, giving for the system an average equilibrium catalyst activity of 32.35%. With the optimum catalyst distribution shown in the table, catalyst withdrawn from the first unit is at the equilibrium catalyst activity of 34.30% while that of the second unit is 30.40%.

When operating the two catalytic units as an integrated system in accordance with the method of this invention, the used catalyst passes from the unit of higher activity to the unit of lower activity and all of the catalyst withdrawn from the system (other than non-recoverable losses from the first unit) taken from the unit of lower catalyst activity, an equilibrium catalyst activity for the system greater than that shown as the optimum average equilibrium activity in Table I may be obtained. The points designated (a) and (b) on the first and second curves, respectively, indicate the equilibrium catalyst activities in the respective units when making the optimum division of fresh make-up catalyst between the units without shifting spent catalyst from one unit to the other.

If twelve tons per day of fresh catalyst is divided in optimum proportions between the two units and the spent catalyst from the unit having higher equilibrium activity is transferred to the unit having the lower equilibrium activity, it will be found that the optimum division of fresh catalyst is changed from the figures given in Table I, and the average equilibrium catalyst activity for the system as a whole has been increased as shown in Table II. In connection with Table II, the fresh catalyst had an equilibrium activity of 55% D+L at 400° F. and the non-recoverable catalyst losses from unit I amounted to 1.7 tons per day.

each unit, discarding from the system the catalyst removed from the unit of lower catalyst equilibrium activity, and adding at least a portion of the catalyst withdrawn from the unit of higher catalyst equilibrium activity to the catalyst circulating through the unit of lower catalyst equilibrium activity.

Table II

| | | | | | | | | | | | | |
|---|---|---|---|---|---|---|---|---|---|---|---|---|
| Unit I: | | | | | | | | | | | | |
| Fresh Catalyst, Tons Per Day | 1.7 | 2.0 | 3.0 | 4.0 | 4.0 | 6.0 | 7.0 | ¹8.0 | 9.0 | 10.0 | 11.0 | 12.0 |
| Equilibrium Activity, Per Cent D+L | 28.25 | 29.00 | 30.80 | 32.10 | 33.10 | 33.90 | 34.55 | 35.15 | 35.68 | 36.15 | 36.62 | 37.05 |
| Unit II: | | | | | | | | | | | | |
| Fresh Catalyst, Tons Per Day | 10.3 | 10.0 | 9.0 | 8.0 | 7.0 | 6.0 | 5.0 | ¹4.0 | 3.0 | 2.0 | 1.0 | 0.0 |
| Equilibrium Activity with no Catalyst Transfer, Per Cent D+L | 32.75 | 32.65 | 32.28 | 31.83 | 31.35 | 30.80 | 30.10 | 29.25 | 28.20 | 26.65 | 24.00 | 0.00 |
| Spent Catalyst Transferred from Unit I to Unit II, Tons Per Day | 0.0 | 0.3 | 1.3 | 2.3 | 3.3 | 4.3 | 5.3 | 6.3 | 7.3 | 8.3 | 9.3 | 10.3 |
| Activity of Spent Catalyst Transferred from Unit I, Per Cent D+L | 28.25 | 29.00 | 30.80 | 32.10 | 33.10 | 33.90 | 34.55 | 35.15 | 35.68 | 36.15 | 36.62 | 37.05 |
| Equilibrium Activity, Per Cent D+L | 32.75 | 32.63 | 32.25 | 31.84 | 31.45 | 31.05 | 30.57 | 30.05 | 29.47 | 28.69 | 27.56 | 22.06 |
| Average Equilibrium Activity, Per Cent D+L | 30.50 | 30.81 | 31.52 | 31.97 | 32.28 | 32.48 | 32.56 | ¹32.60 | 32.57 | 32.42 | 32.09 | 29.56 |

¹ Optimum.

It will be seen from Table II that the optimum distribution of fresh catalyst between the two units is eight tons per day at the first unit and four tons per day at the second unit with 6.3 tons per day of spent catalyst transferred from the first to the second unit. This distribution results in an equilibrium catalyst activity of 35.15% and 30.05% at the first and second units (points (c) and (d) on Figure 2), respectively, giving the system an average equilibrium catalyst activity of 32.60%. With the optimum distribution shown in Table II, the 6.3 tons of catalyst transferred from the first unit to the second is at an equilibrium catalyst activity of 35.15% while the catalyst withdrawn from the second unit has an equilibrium activity of 30.05%. The shifting of catalyst from the first to the second unit does not change the equilibrium catalyst activity in the first unit, but does increase the equilibrium catalyst activity in the second unit.

It will be noted that the average equilibrium catalyst activity at the two units, when employing optimum distribution of fresh make-up catalyst, is increased from 32.35% to 32.60% by transferring the optimum amount of spent catalyst from the unit having the higher equilibrium to the unit having the lower equilibrium activity. Although the difference between the average equilibrium activities appears small (0.25% D+L), this increase in the average equilibrium activity results in the production of products having about $275 per day greater value than would be produced from the same amount of fresh catalyst when not employing the process of the present invention. In operations where a higher fresh catalyst make-up rate is desirable or where lower non-recoverable losses are obtainable on the unit having highest equilibrium activity, a greater amount of catalyst can be shifted from one unit to the other and a correspondingly greater effect on the increase of average catalyst activity can be obtained.

Having fully described the practice of the present invention, what we desire to claim as new and useful and to secure by Letters Patent is:

1. In a system for catalytically converting hydrocarbons including at least two units, with each unit comprising a reaction zone and a regeneration zone, in which catalyst is continuously circulated in each unit from the reaction zone to the regeneration zone, and from the regeneration zone to the reaction zone, in which a hydrocarbon feed stock is intimately contacted with catalyst in the reaction zone to cause conversion of at least a portion thereof, and in which one unit has a higher catalyst equilibrium activity than the other unit, the steps of adding fresh catalyst to the catalyst circulating in each of said units, removing catalyst from the catalyst circulating in each unit, discarding from the system the catalyst removed from the unit of lower catalyst equilibrium activity, and adding at least a portion of the catalyst withdrawn from the unit of higher catalyst equilibrium activity to the catalyst circulating through the unit of lower catalyst equilibrium activity.

2. A process in accordance with claim 1 in which catalyst is withdrawn from the reactor of the unit of higher catalyst equilibrium activity and charged to the reactor of the unit of lower catalyst equilibrium activity.

3. A process in accordance with claim 1 in which catalyst is withdrawn from the regenerator of the unit of higher catalyst equilibrium activity and charged to the regenerator of the unit of lower catalyst equilibrium activity.

4. In a system for catalytically converting hydrocarbons including at least two units, with each unit comprising a reaction zone and a regeneration zone, in which catalyst is continuously circulated in each unit from the reaction zone to the regeneration zone, and from the regeneration zone to the reaction zone, in which a hydrocarbon feed stock is intimately contacted with catalyst in the reaction zone to cause conversion of at least a portion thereof, in which one unit has a higher catalyst equilibrium activity than the other unit and in which a minor portion of catalyst is continuously lost with the regenerator gases from the regenerator of the unit of higher catalyst equilibrium activity, the steps of adding fresh catalyst to the catalyst circulating in each unit, discarding from the system the catalyst removed from the unit of lower catalyst equilibrium activity, and adding to the catalyst circulating through the unit of lower catalyst equilibrium activity all the catalyst removed from the unit of higher catalyst equilibrium activity except that lost with the regenerator gases.

5. A process in accordance with claim 4 in which catalyst is withdrawn from the reactor of the unit of higher catalyst equilibrium activity and charged to the reactor of the unit of lower catalyst equilibrium activity.

6. A process in accordance with claim 4 in which catalyst is withdrawn from the regenerator of the unit of higher catalyst equilibrium activity and charged to the regenerator of the unit of lower catalyst equilibrium activity.

JULIAN P. HAMILTON.
ARTHUR C. RUBEY, Jr.

REFERENCES CITED

The following references are of record in the file of this patent:

UNITED STATES PATENTS

| Number | Name | Date |
|---|---|---|
| 2,358,888 | Thomas | Sept. 26, 1944 |
| 2,339,874 | Nysewander | Jan. 25, 1944 |
| 2,308,557 | Watson | Jan. 19, 1943 |
| 2,349,574 | Conn | May 23, 1944 |
| 2,322,019 | Hemminger | June 15, 1943 |
| 2,377,089 | Linn | May 29, 1945 |